United States Patent [19]

Chu

[11] Patent Number: 4,823,835
[45] Date of Patent: Apr. 25, 1989

[54] UNIVERSAL SWIVEL HAVING A DRIVING HANDLE AND VALVE MEANS

[76] Inventor: George Chu, P.O. Box 10160, Taipei, Taiwan

[21] Appl. No.: 228,717

[22] Filed: Aug. 5, 1988

[51] Int. Cl.[4] .......................... F16K 37/00; F16L 27/00
[52] U.S. Cl. .................................... 137/557; 137/580; 285/93; 285/168
[58] Field of Search ................... 137/580, 557; 285/93, 285/168

[56] References Cited

U.S. PATENT DOCUMENTS

| | | | |
|---|---|---|---|
| 3,526,418 | 9/1970 | Barrett | 285/93 |
| 4,362,324 | 12/1982 | Kelly | 285/168 |
| 4,702,276 | 10/1987 | Bouteille et al. | 137/580 |

FOREIGN PATENT DOCUMENTS 1139383  6/1957  France ............................... 285/168

Primary Examiner—A. Michael Chambers

[57] ABSTRACT

A universal swivel includes an inlet conduit, a swivel coupler having a side conduit rotatably engageable with the inlet conduit, an outlet conduit longitudinally rotatably mounted in a block of the coupler to be universally oriented relative to the inlet conduit, and an adjusting valve formed in the outlet conduit for adjusting a fluid flow rate through the swivel joint and also serving as a driving handle for operating the outlet conduit with respect to the inlet conduit.

6 Claims, 2 Drawing Sheets

UNIVERSAL SWIVEL HAVING A DRIVING HANDLE AND VALVE MEANS

BACKGROUND OF THE INVENTION

Knight disclosed a torsionally controlled swivel joint in his U.S. Pat. No. 4,111,465 which is illustrated as a component of a flexible conduit system used for loading a tanker track with fluid such as gasoline, oil or water, in which a torque element or torsion spring 25 is retained between two swivel sections to balance any rotational force acting on the two sections. However, Knight's device is preferably suitable for heavy-load application such as used for loading arm and if being applied for a small-load pneumatic swivel system, the internal torsion spring may resiliently force two swivel sections strongly, causing an inconvenient universal rotation for operating the swivel.

Fleckenstein taught a universal pneumatic swivel in U.S. Pat. No. De 270, 369 which is however lacking of an operating handle for rotating the swivel sections and also not provided with a valve means directly in the swivel joint for controlling a flow rate of fluid passing through the swivel joint, to still be unsatisfactory for uses in pneumatic or hydraulic tools.

The present inventor has found the drawbacks of conventional swivels and invented the present universal swivel having a driving handle and valve means.

SUMMARY OF THE INVENTION

The object of the present invention is to provide a universal swivel having an inlet section, a swivel coupling means for rotatably mounting the inlet section on a lateral conduit of the coupling means, an outlet section rotatably mounted in the coupling means to be perpendicular to the lateral conduit, and an adjusting valve means formed in the outlet section for controlling a flow rate of a fluid passing through the swivel, and the adjusting valve mounted with the outlet section also serving as a driving handle for an easier rotation of the swivel.

DETAILED DESCRIPTION

Figure 1:
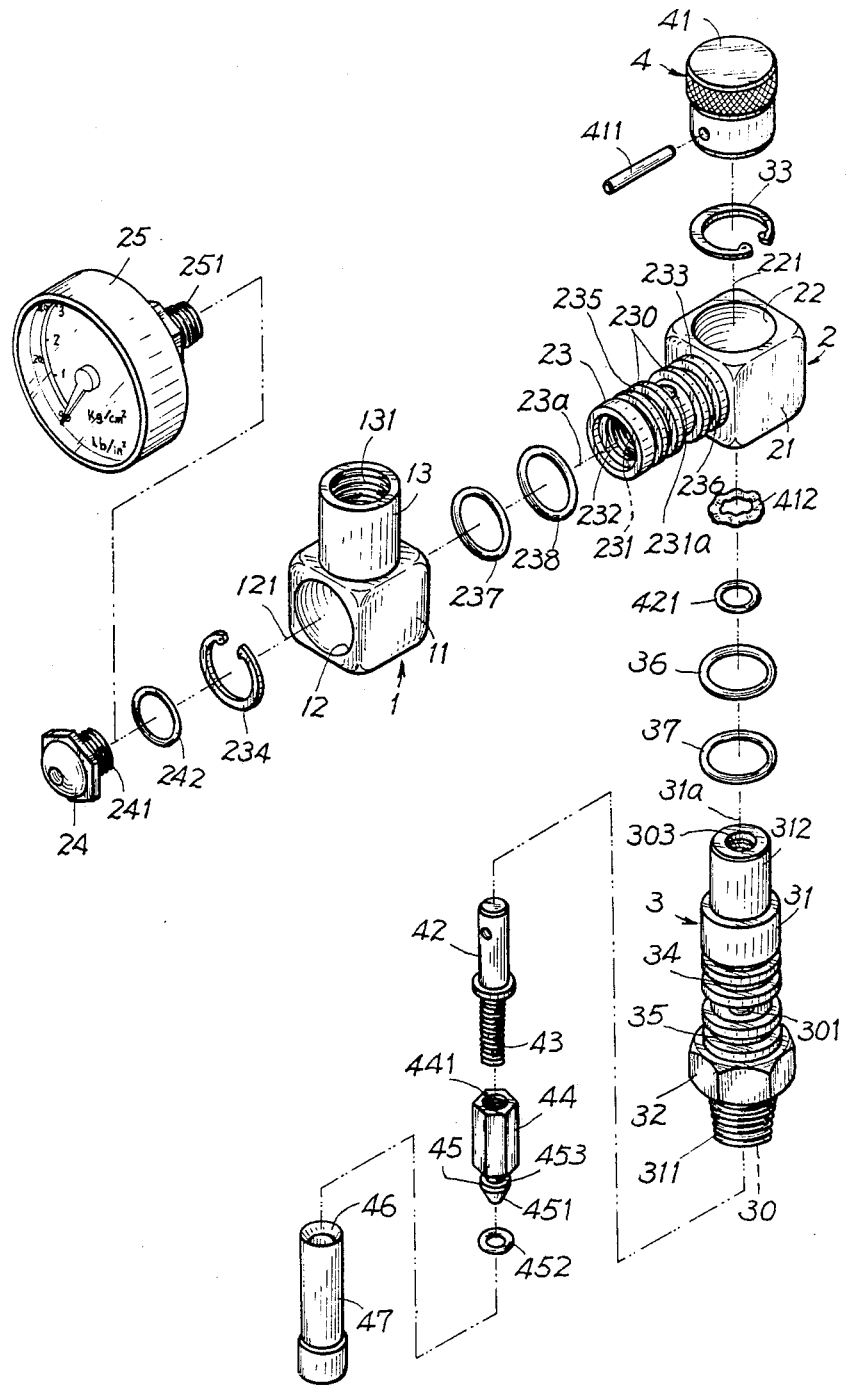
FIG. 1 is a perspective view showing all elements in construction of the present invention.

As shown in the figures, the present invention comprises: an inlet section 1, a swivel coupling means 2, an outlet section 3, and an adjusting valve means 4.

The inlet section 1 includes a first block 11 having a first female through hole 12 transversely formed therein, and an inlet conduit 13 for connecting an inlet tube 1a of a pneumatic or hydraulic system protruding upwardly from the first block 11 having an inlet hole 130 formed in the conduit 13 fluidically communicated with the first female through hole 12. The inlet conduit 13 is formed with a female threaded hole 131 on an upper portion of the inlet hole 130 for connecting a tube for directing a pneumatic or hydraulic fluid into the conduit 13. An axis 130a of the inlet conduit 13 is perpendicular to a center line 121 of the first female through hole 12 formed in the first block 11.

The swivel coupling means 2 includes a second block 21 having a second female through hole 22 vertically formed therein having a center line 221 of the through hole 22 perpendicular to the center line 121 of the first female hole 12 of first block 11, a side conduit 23 laterally protruding from the second block 21 for rotatably mounting the first block 11 thereon, a cap 24 sealing an outermost opening 232 of the side conduit 23, and a pressure gauge 25 selectively mounted on the opening 232 for replacing the cap 24.

The side conduit 23 protruding laterally from the second block 21 includes: a generally cylindrical circumference 230 rotatably engageable with the first female through hole 12 of the first block, a central hole 231 formed through the conduit 23 to fluidically communicate with the second female hole 22 having an axis 23a of the conduit 23 aligned with the center line 121 of the first block 11, a female threaded portion 232 formed on an outermost end of the central hole 231 to be engaged with a male threaded portion 241 of the cap 24 of the pressure gauge 25, an inner flange 233 formed on an inner end portion of conduit 23 adjacent to one side wall of the block 21 and an outer retainer 234 formed on an outer portion of the conduit 23 rotatably defining the first block 11 therebetween when the block 11 is rotatably mounted on the side conduit 23, and a pair of packing rings 237, 238 respectively embedded in a pair of annular grooves 235, 236 recessed from the cylindrical circumference 230 and disposed on two opposite sides of a central annular groove 230a fluidically communicated with the inlet hole 130 of the inlet section 1 and a central transverse through hole 231a which is formed transversely through the conduit wall intersecting the central hole 231. The pair of packing rings 237, 238 serve to seal the female hole 12 and the side conduit 23 to allow a nonleaking fluid flow through the inlet hole 130 of the inlet section 1, the central groove 230a, the transverse through hole 231a and the central hole 231.

The outlet section 3 includes: an outlet conduit 31 having a general cylindrical circumference 310 rotatably engageable with the second female through hole 22 and having an axis 31a aligned with the center line 221 of the female hole 22, a lower male threaded portion 311 for connecting a flexible hose 3a, an upper tube portion 312 for rotatably mounting a stem 42 of the valve means 4, a lower flange 32 formed on a lower portion of the conduit 31 and an upper retainer 33 formed on an upper portion of the conduit 31 commonly defining the second block 21 between the retainer 33 and the lower flange 32 to allow the block 21 rotatably engageable with the conduit 31, a longitudinal through hole 30 formed in the conduit 31 having its upper portion formed as a hexagonal hole 302, a horizontal transverse through hole 301 formed through the conduit wall on a middle portion of the conduit 31 to intersect the longitudinal through hole 30, a central annular groove 310a recessed from the cylindrical circumference 310 to communicate with the transverse hole 301 and the central hole 231 of the side conduit 23, and a pair of packing rings 36, 37 respectively embedded in a pair of annular grooves 34, 35 rrecessed from the cylindrical circumference 310 and disposed on two opposite sides of the central annular groove 310a to seal the female hole 22 and the groove 310a. An uppermost cylindrical hole 303 formed in an upper portion 312 of the conduit 31 above the hexagonal hole 302 to rotatably mount the stem 42 of valve means 4.

The adjusting valve means 4 includes a rotating knob 41, a stem 42 rotatably mounted in the upper portion 312 of conduit 31, a male threaded portion 43 protruding downwardly from the stem 42, a hexagonal plunger 44 reciprocatively engageable with the hexagonal hole 302 of conduit 31 having a lower plug 45 secured thereunder, and a valve seat 46 positioned adjacent to and deviated at a right angle from the transverse hole 301 and the central hole 231 of side conduit 23 for operatively receiving the plug 45 to close an aperture 450 between the plug 45 and seat 46.

The seat may be formed as a cylindrical pipe 47 fixed in the hole 30 of conduit 31 for its easier assembly. The hexagonal plunger 44 and the corresponding hexagonal hole 302 may also be modified as other polygonal shapes. The hexagonal plunger 44 is formed a female threaded hole 441 therein to engage the male threaded portion 43 of the stem 42.

The knob 41 is secured to the stem 42 by a pin 411 and resiliently held on a top end portion of the conduit 31 by a corrugated spring 412. The lower plug 45 includes a inverse-truncated-cone plug 451 protruding downwardly from the plunger 44 and a valve packing ring 452 jacketed on a neck portion 453 between the plug 451 and the plunger 44 to absolutely seal the plug 451 on the seat 46, when rotating the knob 41 to descend the plunger 44.

Figure 3:
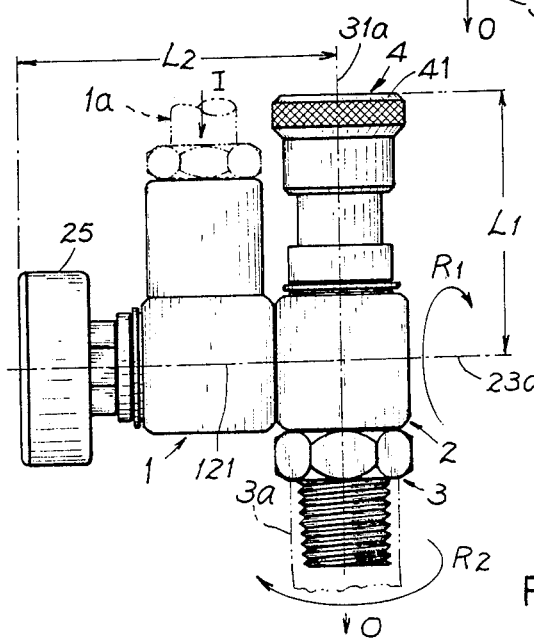
FIG. 3 is an illustration showing an application of the present invention in a pneumatic or hydraulic system.

The present invention has the following advantages superior to a conventional pneumatic swivel:

1. Reviewing a universal swivel application of the present invention as shown in FIG. 3 the valve means 4 in combination with the outlet section 3 is formed as a "driving handle" so that an operator's hand can hold and rotate the knob 41 and conduit 31 (outlet section 3) around the axis 23a in a direction of R1 to have a longer force arm L1 for saving energy or human power. Similarly, an operator may hold the gauge (25) side to rotate the inlet section 1 around the axis 31a (R2) with a longer force arm L2 for energy saving purpose.
2. A pressure gaauge 25 may be directly mounted on the swivel for easy reading and monitoring purpose.
3. A valve means 4 is provided for adjusting a fluid flow through the swivel or for emergency stop of a fluid flow if handling a flammable fluid and an accident being caused at a downstream side beyond the swivel.
4. Since this invention is utilized for handling a pneumatic or hydraulic fluid under lighter duty than the Knight's swivel joint, the packing rings 237, 238, 36, 37 are provided for frictionally retaining one section relative to the other section of the swivel joint for balancing a rotational torque so that the torsional spring 25 as found in Knight's device is saved or omitted. So, each packing ring of this invention plays double roles, both for sealing purpose and also for torsionally controlling the relative rotation of the two sections of the swivel joint.

The pressure gauge 25 used in this invention may serve as a driving handle for a universal swivel joint, so that it should be made as a rigid structure to prevent leakage problem.

The packing rings of this invention may also serve as shock absorber during a universal rotation operation of the swivel joint.

Figure 2:
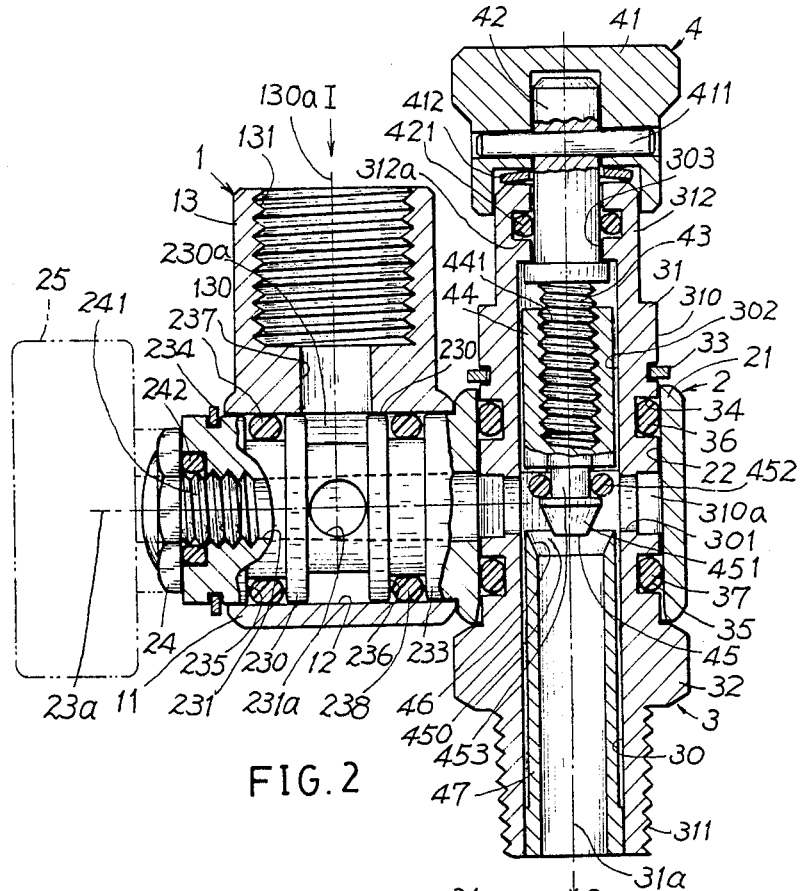
FIG. 2 is a sectional illustration of the present invention as assembled.

The inlet conduit 13 and outlet conduit 31 of this invention may also be reversed for alternatively changing a fluid direction opposite to that as shown in FIG. 2.

I claim:

1. A universal swivel comprising:
   an inlet section having a first block having a first female through hole transversely formed therein and an inlet conduit for connecting an inlet tube for pneumatic or hydraulic fluid protruding upwardly from the first block having an inlet hole formed in said inlet tube communicated with the first female through hole;
   a swivel coupling means having a second block having a second female through hole vertically formed in the second block having a center line of said second female through hole perpendicular to a center line of said first female through hole, a side conduit laterally formed on a side wall of said second block rotatably engageable with said first female through hole of said first block, and a pressure gauge fixed on an outermost end of said side conduit fluidically communicated with said side conduit and said inlet conduit;
   an outlet section having an outlt conduit rotatably engageable with said second female through hole of said second block having a lower portion connected with a flexible hose or outlet tube for a fluid; and
   an adjusting valve means rotatably formed in said outlet conduit operatively adjusting or closing a fluid flow through said outlet conduit and operatively forming a driving handle in combination with said outlet conduit for universally rotating the outlet conduit relative to the inlet conduit.

2. A universal swivel according to claim 1, wherein said side conduit of said swivel coupling means includes: an inner flange formed on an inner portion of the conduit and an outer retainer formed on an outer portion of the conduit to rotatably define the first block as rotatably mounted in said first block, a central hole formed through the side conduit having a central transverse through hole formed in a central portion of the side conduit intersecting the central hole to fluidically communicate the inlet hole of said inlet section and having an innermost end communicated with said second female through hole, and a pair of first packing rings embedded in a pair of annular grooves circumferentially recessed from said side conduit disposed on two opposite sides of said central transverse through hole for sealing said second female through hole.

3. A universal swivel according to claim 1, wherein said pressure gauge fixed on said side conduit of said swivel coupling means is substituted with a cap sealing said central hole of said side conduit.

4. A universal swivel according to claim 1, wherein said outlet conduit of said outlet section includes a longitudinal through hole formed therein having a horizontal transverse through hole formed in a central portion of said outlet conduit intersecting with said longitudinal hole to fluidically communicate with central hole of said side conduit, a lower flange formed on a lower portion of said outlet conduit and an upper retainer formed on an upper portion of said outlet conduit to rotatably define said second block rotatably engageable with said outlet conduit, and a pair of second packing rings embedded in a pair of annular grooves circumferentially recessed from said outlet conduit disposed on two opposite sides of said horizontal transverse through hole to seal said second female through hole.

5. A universal swivel according to claim 1, wherein said adjusting valve means includes a knob fixed on a top end of a stem rotatably mounted in a cylindrical hole formed on an uppermost portion of said longitudinal through hole of said outlet conduit, a male threaded portion protruding downwardly from said stem, a polygonal plunger having a lower plug protruding thereunder reciprocatively moving in a polygonal hole formed on an upper portion of said longitudinal through hole and having a female threaded hole formed therein engageable with said male threaded portion of said stem, and a valve seat formed in said outlet conduit adjacent to and deviated at a right angle from said horizontal through hole of said outlet conduit and said central hole of said side conduit, whereby upon a rotation of the knob to rotate said stem and said male-threaded portion, said plunger is downwardly moved to allow said plubg to close said valve seat or to adjust an annular aperture between said plug and said seat for closing said valve.

6. A universal swivel according to claim 5, wherein said lower plug includes a plug formed as an inverse-truncated-cone shape operatively forming an aperture with said valve seat and a valve packing ring jacketed on a neck portion between said plug and said plunger operatively sealing said valve seat.

* * * * *